United States Patent
Bantz (10) Patent No.: US 9,392,871 B2
(45) Date of Patent: Jul. 19, 2016

(54) LIFT-OFF DOOR FOR EQUIPMENT ENCLOSURE

(71) Applicant: Sullair, LLC, Michigan City, IN (US)

(72) Inventor: Shannon Ryan Bantz, LaPorte, IN (US)

(73) Assignee: Sullair, LLC, Michigan City, IN (US)

( * ) Notice: Subject to any disclaimer, the term of this patent is extended or adjusted under 35 U.S.C. 154(b) by 0 days.

(21) Appl. No.: 14/532,477

(22) Filed: Nov. 4, 2014

(65) Prior Publication Data

US 2016/0120306 A1    May 5, 2016

(51) Int. Cl.
| | | |
|---|---|---|
| A47B 96/20 | (2006.01) | |
| A47B 55/00 | (2006.01) | |
| A47B 95/00 | (2006.01) | |
| A47B 47/00 | (2006.01) | |
| A47B 81/00 | (2006.01) | |

(52) U.S. Cl.
CPC .............. *A47B 55/00* (2013.01); *A47B 47/0091* (2013.01); *A47B 81/00* (2013.01); *A47B 95/00* (2013.01); *A47B 96/201* (2013.01); *A47B 2220/0052* (2013.01)

(58) Field of Classification Search
CPC .............. A47B 55/00; A47B 47/0066; A47B 47/0091; A47B 81/00; A47B 95/00; A47B 96/20; A47B 96/201
USPC ............... 312/100, 102, 257.1, 265.6, 293.3; 49/463, 465; 174/64
See application file for complete search history.

(56) References Cited

U.S. PATENT DOCUMENTS

| | | | | |
|---|---|---|---|---|
| 3,363,953 | A * | 1/1968 | Lacan | F16B 12/02 |
| | | | | 312/100 |
| 3,365,535 | A * | 1/1968 | Wilk | H01F 27/02 |
| | | | | 174/50 |
| 4,589,709 | A * | 5/1986 | Bond | E05B 73/00 |
| | | | | 109/68 |
| 5,423,605 | A * | 6/1995 | Liu | H05K 5/0013 |
| | | | | 312/111 |
| 2005/0152106 | A1 * | 7/2005 | Coster | G06F 1/181 |
| | | | | 361/679.58 |

* cited by examiner

*Primary Examiner* — James O Hansen
(74) *Attorney, Agent, or Firm* — James R. Gourley; Carstens & Cahoon, LLP (57) ABSTRACT

A lift-off door for an equipment enclosure is provided which comprises tabs on the bottom end of the door that align with slots at the bottom edge of an access window in an equipment housing frame. The tabs extend from a vertical panel on the door through two acute bend angles which are opposite in direction.

8 Claims, 8 Drawing Sheets

LIFT-OFF DOOR FOR EQUIPMENT ENCLOSURE

BACKGROUND OF THE INVENTION

1. Technical Field

The present invention relates to a lift-off door for an equipment enclosure, and more particularly to an equipment enclosure door with alignment and support tabs that is self-supporting when removed from the enclosure and set on a level surface.

2. Background

Door panels are included as part of the exterior shell of many different types of equipment. Some such doors can be completely removed from the equipment unit and set aside while a user repairs components or adjusts inputs on the equipment. Other types of doors cannot be easily removed from the equipment housing because they are attached by a hinge on one side and a latch on the other. The present invention relates to equipment doors that are completely removable from the equipment enclosure.

SUMMARY OF THE INVENTION

In one embodiment, an equipment door comprises a vertical panel, a top and a bottom end, wherein the equipment door is a lift-off door that at least partially covers an access window on an equipment housing frame, wherein the access window is defined at least in part by a top edge on the equipment housing frame and a bottom edge on the equipment housing frame, wherein the top end of the equipment door comprises a fastener that removably attaches the top end of the door to the top edge of the access window, further wherein the bottom end of the door comprises at least one tab, wherein the at least one tab extends from a bottom edge of the door from a first acute bend angle between the vertical panel and a first tab portion, further wherein the at least one tab comprises a second tab portion connected to the first tab portion through a second acute bend angle, wherein the first bend angle and second bend angle are opposite in direction, wherein the bottom edge of the door and a distal end of the second tab portion define a first plane that is approximately perpendicular to a second plane defined by the vertical panel, further wherein each tab engages the equipment housing frame at a slot located on the bottom edge of the access window.

In other embodiments, the equipment door according to any other embodiment described herein may have any combination of the following features: at least two tabs; the second tab portion of each tab is tapered; a bottom lip extending from said first acute bend angle and integral to said first tab portion; or wherein said fastener is a rotatable latch.

In one embodiment, an equipment housing assembly comprises: an equipment housing frame comprising at least one access window, wherein the access window is defined by a top edge on the equipment housing frame and a bottom edge on the equipment housing frame; a lift-off equipment door that covers at least part of the access window, wherein the door comprises: a vertical panel; a top; and a bottom end; wherein the top end of the equipment door comprises a fastener that removably attaches the top end of the door to the top edge of the access window; further wherein the bottom end of the door comprises at least one tab; wherein the at least one tab extends from a bottom edge of the door from a first acute bend angle between the vertical panel and a first tab portion; further wherein the at least one tab comprises a second tab portion connected to the first tab portion through a second acute bend angle; wherein the first bend angle and second bend angle are opposite in direction; wherein the bottom edge of the door and a distal end of the second tab portion define a first plane that is approximately perpendicular to a second plane defined by the vertical panel; and further wherein each tab engages the equipment housing frame at a slot located on the bottom edge of the access window.

In other embodiments, the equipment housing assembly of any other embodiment described herein may have any combination of the following features: wherein the door comprises at least two tabs; wherein the second tab portion of each tab is tapered; a bottom lip extending from said first acute bend angle and integral to said first tab portion; or wherein said fastener is a rotatable latch.

BRIEF DESCRIPTION OF THE DRAWINGS

The invention may be understood by reference to the following description taken in conjunction with the accompanying drawings, in which, like reference numerals identify like elements, and in which.

DETAILED DESCRIPTION

Figure 3:
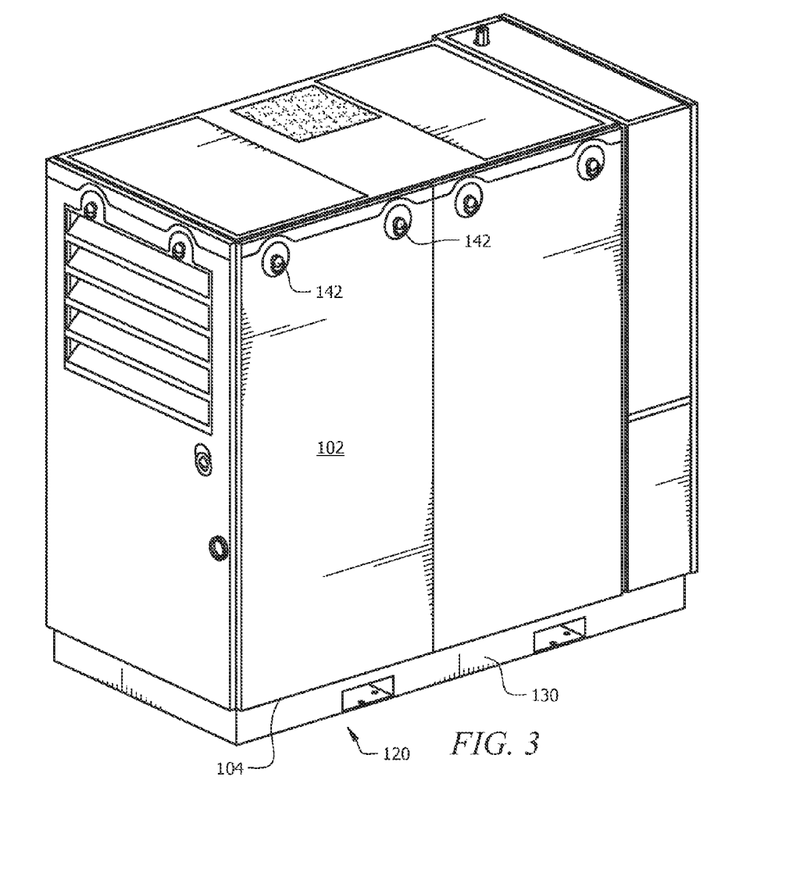
FIG. 3 is a perspective view of a piece of equipment having a housing frame with several removable doors.

The equipment door of the present invention is intended for use on an equipment unit that is housed in a frame. Preferably, the equipment comprises an air compressor unit, and the door is a removable door that allows a user to access an interior portion of the equipment housing frame through an access window in order to repair, maintain or adjust the settings of the unit. An exemplary embodiment of an air compressor with several removable doors is depicted in FIG. 3 with the doors on, and in FIG. 4 with the doors off.

Figure 1:
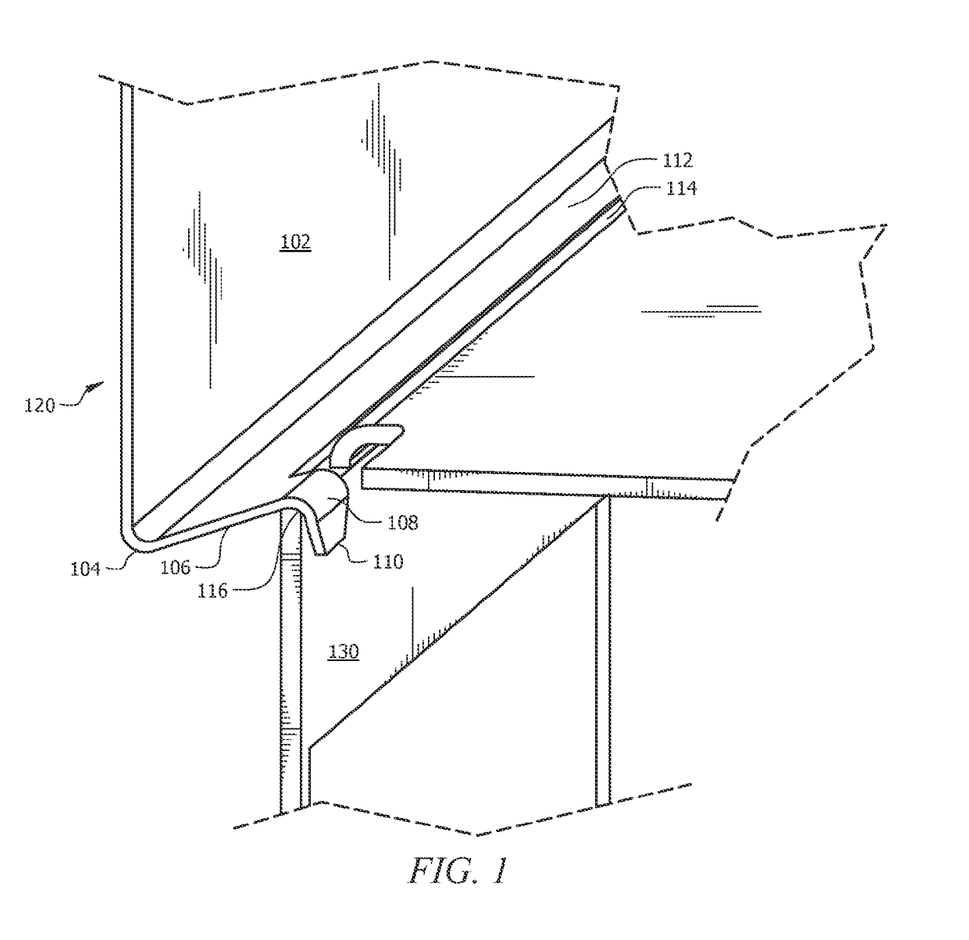
FIG. 1 depicts a cutaway perspective view of the bottom end of one embodiment of the equipment door of the present invention with a tab engaged with a slot on an equipment housing frame.

FIG. 1 is a perspective view of a cutaway portion of the bottom end of one embodiment of the equipment door of the present invention. The perspective shown in FIG. 1 is from inside the equipment unit looking out. Therein, a portion of the bottom end of the inventive door 120 is depicted engaged with equipment housing 130. In one embodiment, the door 120 comprises a vertical panel 102, a lower edge 104, and a tab comprising first portion 106 and second portion 110.

The first tab portion 106 is adjacent to the door's lower edge 104, wherein the first tab portion 106 is connected to the vertical panel 102 by a first acute bend angle at lower edge 104. As used herein, the term "acute bend angle" means a bend angle that measures less than 90 degrees. The first acute bend angle is acute as between the vertical panel 102 and first tab portion 106.

The second tab portion 110 is distal from the vertical panel 102, separated from vertical panel 102 by first tab portion 106, and is connected to the first tab portion 106 by second acute bend angle 108, which is acute between the first tab portion 106 and second tab portion 110 but bent in a direction opposite the first acute bend angle at lower edge 104. Another way to describe the tab structure is that first tab portion 106 separates the vertical panel 102 from second tab portion 110, and is connected to each by an acute bend angle, wherein each acute bend angle is opposite in direction.

As depicted in FIG. 1, the first portion of the tab 106 may also be integral to or form a part of a lower lip 112 on the door 120, which in one embodiment is also connected to the vertical panel by an acute bend angle at lower edge 104, which is bent in the same direction as the first acute bend angle that connects the first portion of the tab 106 to the vertical panel 102.

The door 120 depicted in FIG. 1 is shown with the tab resting on slot support surface 116, as the second portion of the tab 110 has been inserted through an opening or slot in equipment housing frame 130. Preferably, the opening or slot in equipment housing frame 130 is located adjacent to the access window at a window lower edge 114 that defines part of the access window.

Figure 2:
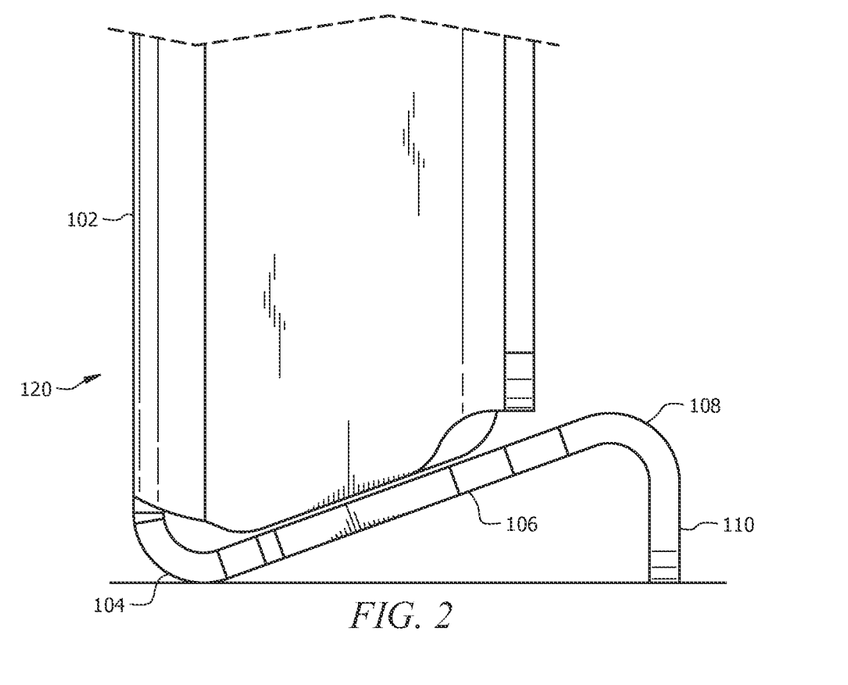
FIG. 2 is a side view of the lower portion of one embodiment of the equipment door of the present invention resting on a level surface.

FIG. 2 depicts a side view of the bottom end of one embodiment of the equipment door of the present invention. This view more clearly shows the first acute bend angle at lower door edge 104 which connects the vertical panel 102 with first tab portion 106, and the second acute bend angle 108 that connects second tab portion 110 with first tab portion 106.

Figure 8:
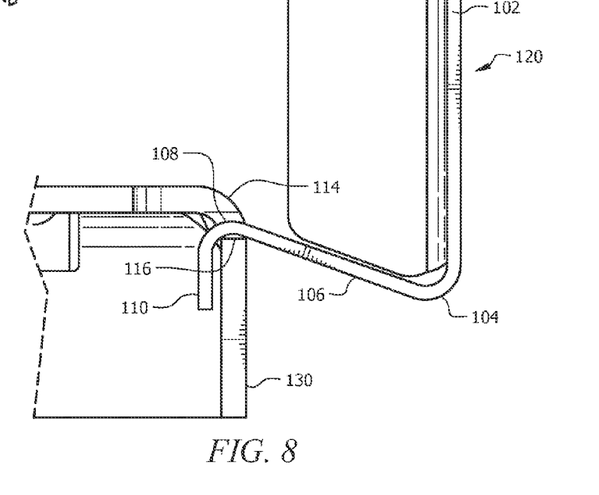
FIG. 8 depicts a side view of one embodiment of the door of the present invention engaged with a slot in the bottom edge of an access window of an equipment housing frame.

FIG. 2 also depicts an important feature of the inventive equipment door. Lower door edge 104 and distal end of second tab portion 110 define a first plane that is approximately perpendicular to a second plane defined by vertical panel 102. The term "approximately perpendicular" as used herein means that the angle defined by the first and second plane is close enough to 90 degrees that the center of gravity of the equipment door allows it to remain upright when set on a flat surface. This feature allows a user to remove the door from the equipment enclosure, place it upright on a flat surface, such as the floor of the room the equipment is located in, and allow the door to sit upright and be self-supporting. FIG. 8 also depicts a side view of the bottom end of the equipment door of the present invention, with the door engaged with the equipment housing.

Figure 9:
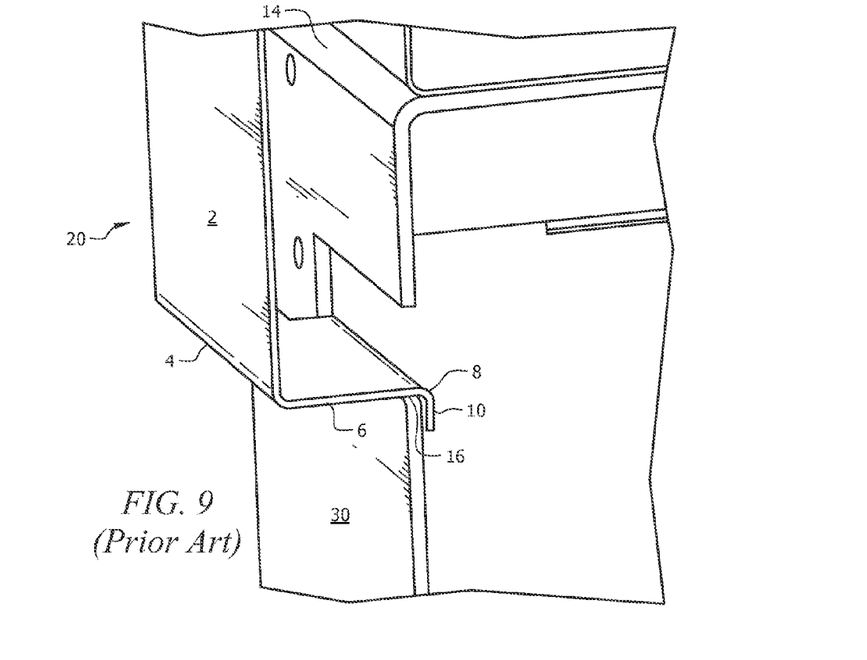
FIG. 9 depicts a zoomed in perspective view of a prior art equipment door.
Figure 10:
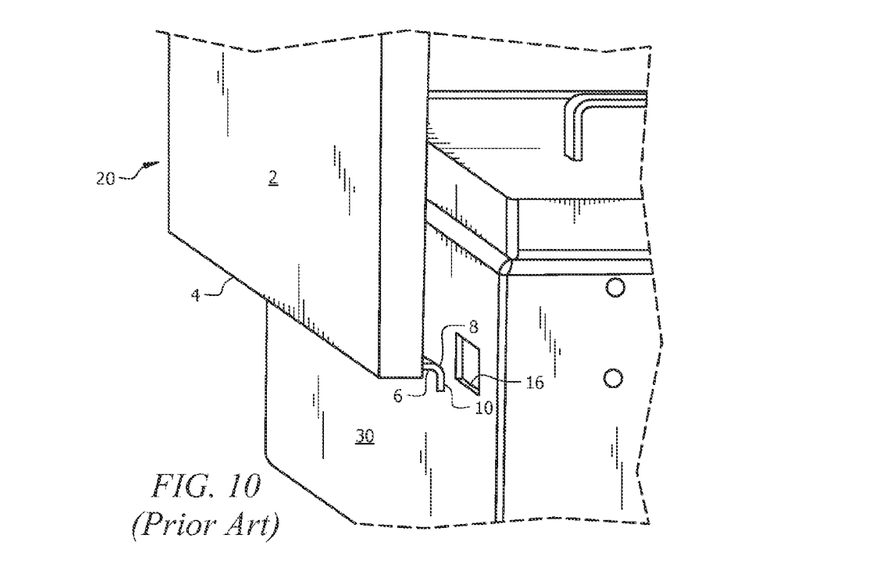
FIG. 10 depicts a perspective view of a prior art equipment door engaging with holes in an equipment enclosure.

A self-standing lift-off door is an improvement in the art. FIGS. 9 and 10 depict the lower end of two prior art lift-off equipment doors. As depicted therein, the tabs are bent at a 90 degree bend angle at lower edge 4 between the vertical panel 2 and first tab portion 6, and again at a 90 degree bend angle at 8 between first tab portion 6 and second tab portion 10. This produces a door that is not self-supporting when set on the floor, and must instead be leaned against another structure, such as a wall, or laid flat on the floor. For convenience, most users of this prior art door lean it against another structure, with the entire weight of the door resting on the tabs. This routinely causes damage to the tabs and the door, making it more difficult for users to securely place the door back on the equipment enclosure.

Figure 4:
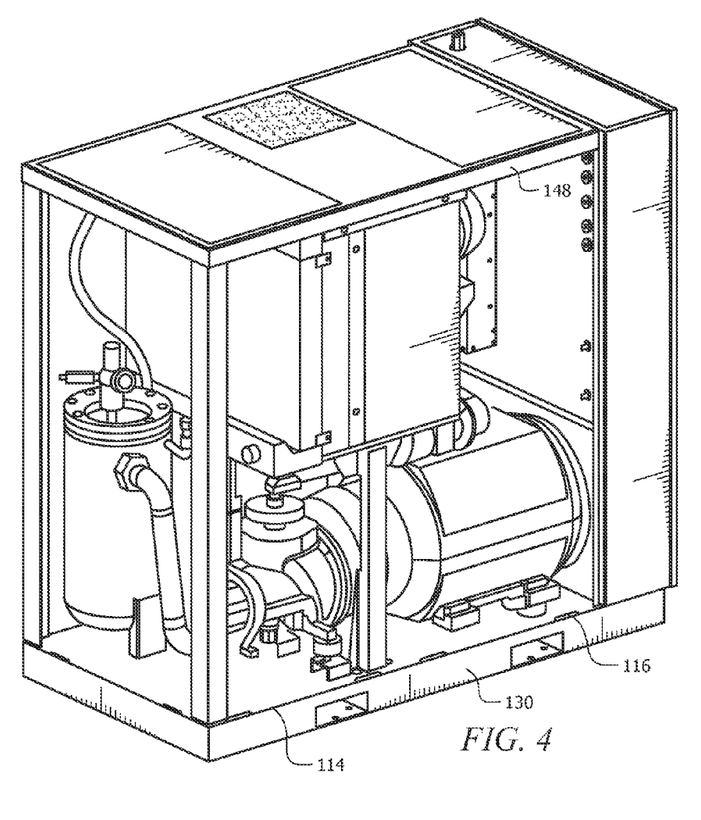
FIG. 4 is a perspective view of an equipment housing frame with the doors removed allowing access to the internal components.
Figure 5:
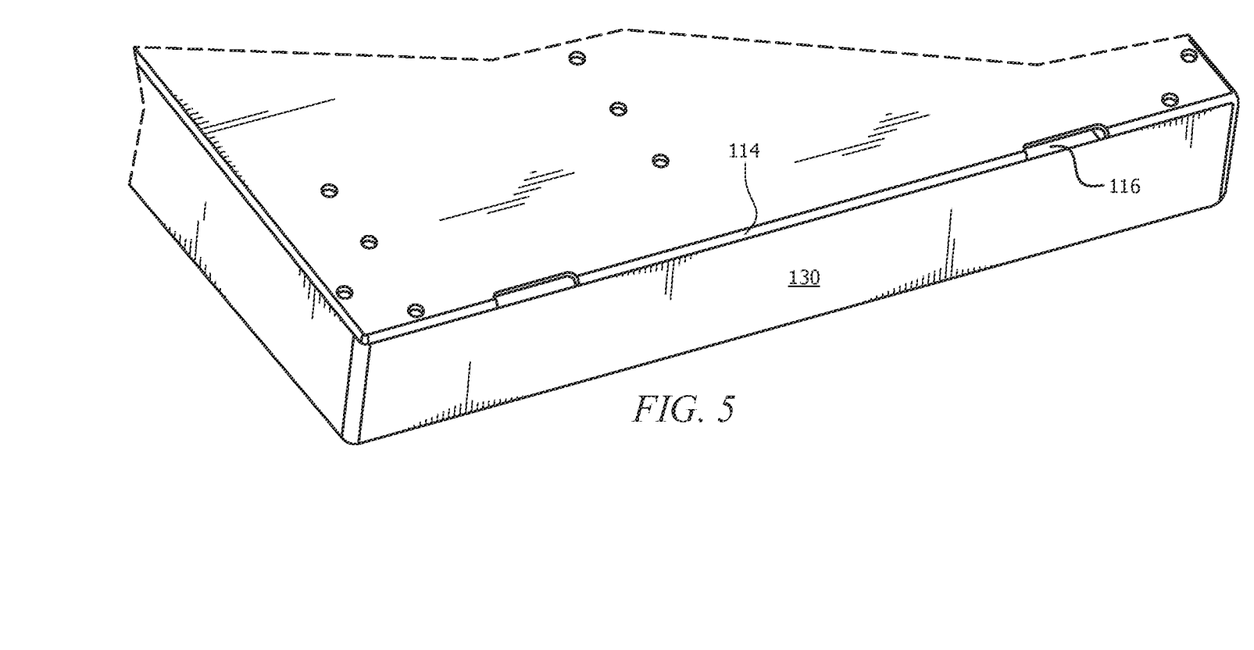
FIG. 5 is a zoomed-in cutaway view of a lower edge of an access window with two slots that receive the door tabs.

A comparison of FIGS. 1-8 with prior art FIGS. 9 and 10 demonstrates another novel feature of one embodiment of the present invention. As depicted in FIGS. 4 and 5, the slots 116 are provided at the edge 114 of equipment housing 130 that defines the bottom edge of the equipment access window. This placement can be contrasted with the prior art slots or openings 16 depicted in FIGS. 9 and 10, which are located below the edge 14 that defines the bottom edge of the equipment access window.

Figure 6:
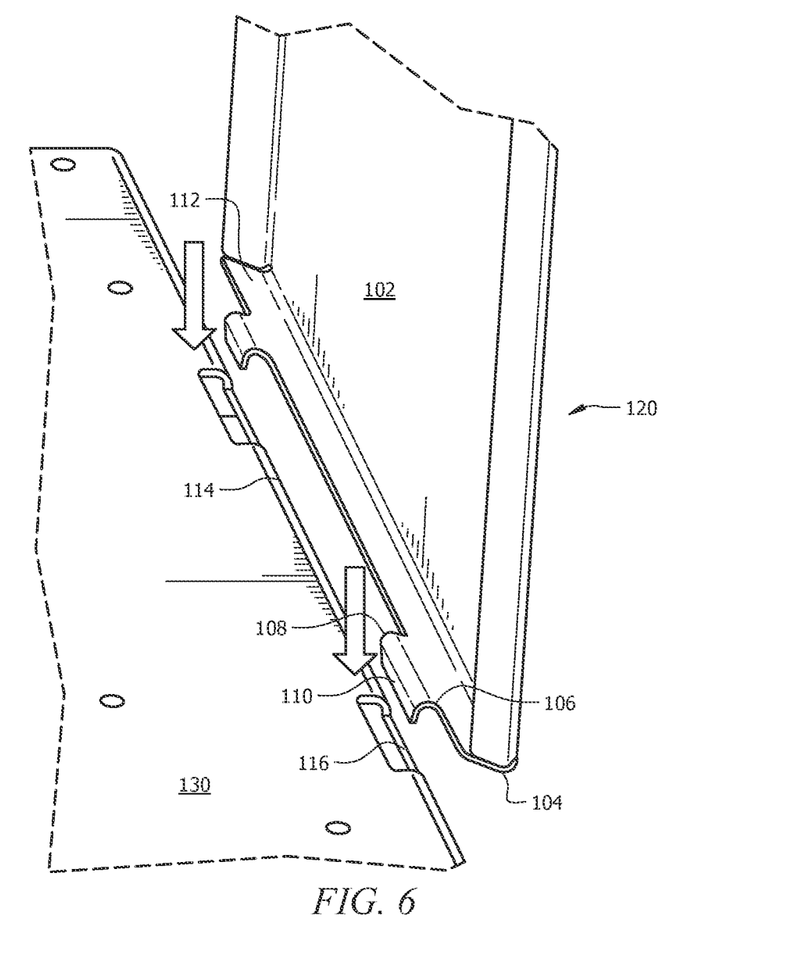
FIG. 6 depicts a perspective view of the equipment door of the present invention engaging the bottom edge of an access window of an equipment housing frame.

One reason that moving the location of the slot to access window bottom edge 114 is an improvement is that it works using a smaller cutout in the equipment housing frame, which increases the strength of the frame over prior art frames. The new location also allows for a straight dropping motion to be used when engaging the door with the equipment housing frame. The new location for the slot also makes the equipment less expensive to produce. FIG. 6 depicts one embodiment of door 120 dropping down into place with equipment housing 130. The prior art location required the user to maneuver the door in more than one planar direction to engage it with the equipment frame. This is more difficult for the user and can also cause damage to the tabs and equipment.

Another feature of one embodiment of the door of the present invention is tapered tabs. As depicted in FIGS. 1 and 6, the second tab portion 110 comprises a tapered tip. The tapered tip, having a smaller width at the tip than at acute bend angle 108, makes the door easier to seat with equipment frame 130. Any slight misalignment during door engagement can cause one of the sides of the tapered tip to engage a sidewall of the slot 116, and thereby cause the door to slide in a direction opposite that sidewall and smoothly into place.

The inventive doors of the present invention may be secured to the equipment housing frame according to any releasable latching mechanism known in the art. In the embodiment depicted in FIG. 3, the inventive door 120 is secured to the equipment housing frame at the top end of the door by rotatable latch 142.

Figure 7:
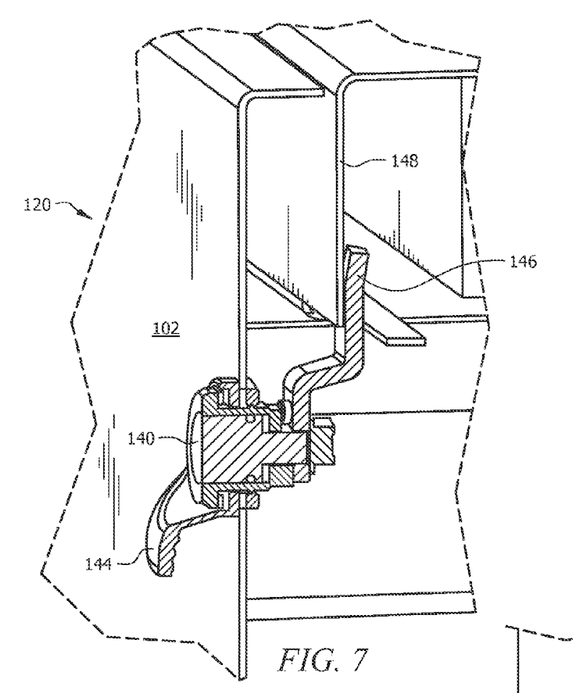
FIG. 7 is a perspective cutaway view of a rotatable latch used to secure the top end of a door to an equipment enclosure.

The rotatable latch 142 is depicted in more detail in FIG. 7, which shows a cutaway portion of the top end of one embodiment of inventive door 120. The rotatable latch 142 comprises a manual lever 144 (or handle) on the outside of the door coupled with a latch bolt 146 on the inside of the door. When the handle 144 is turned in either direction (clockwise or counterclockwise), the latch bolt 146 also turns in that direction. The latch bolt can therefore be engaged or disengaged with bolt strike surface 148 on the equipment housing frame.

The particular embodiment depicted in FIGS. 3 and 7 are not limiting on the type of fastener that can be used to secure the top end of the door to the equipment housing frame. Any mechanism known in the art can be used, such as a biased tongue-and-groove or ridged connection, a key-secured manual latch, or an electronic, pneumatic/solenoid driven fastener.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

What is claimed is:

1. An equipment door comprising:
   a vertical panel, a top and a bottom end, wherein the equipment door is a lift-off door that at least partially covers an access window on an equipment housing frame, wherein the access window is defined at least in part by a top edge on the equipment housing frame and a bottom edge on the equipment housing frame, wherein the top end of the equipment door comprises a fastener that removably attaches the top end of the door to the top edge of the access window, further wherein the bottom end of the door comprises at least one tab, wherein the at least one tab extends from a bottom edge of the door from a first acute bend angle between the vertical panel and a first tab portion, further wherein the at least one tab comprises a second tab portion connected to the first tab portion through a second acute bend angle, wherein the first bend angle and second bend angle are opposite in direction, wherein the bottom edge of the door and a distal end of the second tab portion define a first plane that is approximately perpendicular to a second plane defined by the vertical panel, further wherein each of said at least one tab engages the equipment housing frame at a slot located on the bottom edge of the access window, further wherein the bottom edge of the door and the distal end of the second tab portion contact a flat surface when the door is removed from the equipment enclosure and placed upright on the flat surface with the vertical panel in vertical orientation with the flat surface, further wherein the at least one tab comprises a non-contact surface oriented towards the flat surface and located between the bottom edge of the door and the distal end of the second tab portion that does not contact the flat surface when the door is removed from the equipment enclosure and placed upright on the flat surface, further wherein the equipment door comprises a bottom lip extending from the first acute bend angle at the bottom edge of the door along an entire width of the door, wherein the bottom lip is integral to the first tab portion and continuous along the entire width of the door, further wherein the first tab portion extends from the bottom lip.

2. The equipment door of claim 1 comprising at least two tabs.

3. The equipment door of claim 1 wherein the second tab portion of each of said at least one tab is tapered.

4. The equipment door of claim 1 wherein said fastener is a rotatable latch.

5. An equipment housing assembly comprising:
an equipment housing frame comprising at least one access window, wherein the access window is defined by a top edge on the equipment housing frame and a bottom edge on the equipment housing frame;
a lift-off equipment door that covers at least part of the access window, wherein the door comprises:
a vertical panel;
a top; and
a bottom end;
wherein the top end of the equipment door comprises a fastener that removably attaches the top end of the door to the top edge of the access window;
further wherein the bottom end of the door comprises at least one tab;
wherein the at least one tab extends from a bottom edge of the door from a first acute bend angle between the vertical panel and a first tab portion;
further wherein the at least one tab comprises a second tab portion connected to the first tab portion through a second acute bend angle;
wherein the first bend angle and second bend angle are opposite in direction;
wherein the bottom edge of the door and a distal end of the second tab portion define a first plane that is approximately perpendicular to a second plane defined by the vertical panel; and
further wherein each of said at least one tab engages the equipment housing frame at a slot located on the bottom edge of the access window, further wherein the bottom edge of the door and the distal end of the second tab portion contact a flat surface when the door is removed from the equipment enclosure and placed upright on the flat surface with the vertical panel in vertical orientation with the flat surface, further wherein the at least one tab comprises a non-contact surface oriented towards the flat surface and located between the bottom edge of the door and the distal end of the second tab portion that does not contact the flat surface when the door is removed from the equipment enclosure and placed upright on the flat surface, further wherein the equipment door comprises a bottom lip extending from the first acute bend angle at the bottom edge of the door along an entire width of the door, wherein the bottom lip is integral to the first tab portion and continuous along the entire width of the door, further wherein the first tab portion extends from the bottom lip.

6. The equipment housing assembly of claim 5 wherein the door comprises at least two tabs.

7. The equipment housing assembly of claim 5 wherein the second tab portion of each of said at least one tab is tapered.

8. The equipment housing assembly of claim 5 wherein said fastener is a rotatable latch.

* * * * *